H. H. GRAY.
DIRECTION INDICATOR FOR MOTOR CARS.
APPLICATION FILED NOV. 18, 1916. RENEWED APR. 7, 1921.
1,379,863.
Patented May 31, 1921.
2 SHEETS—SHEET 1.
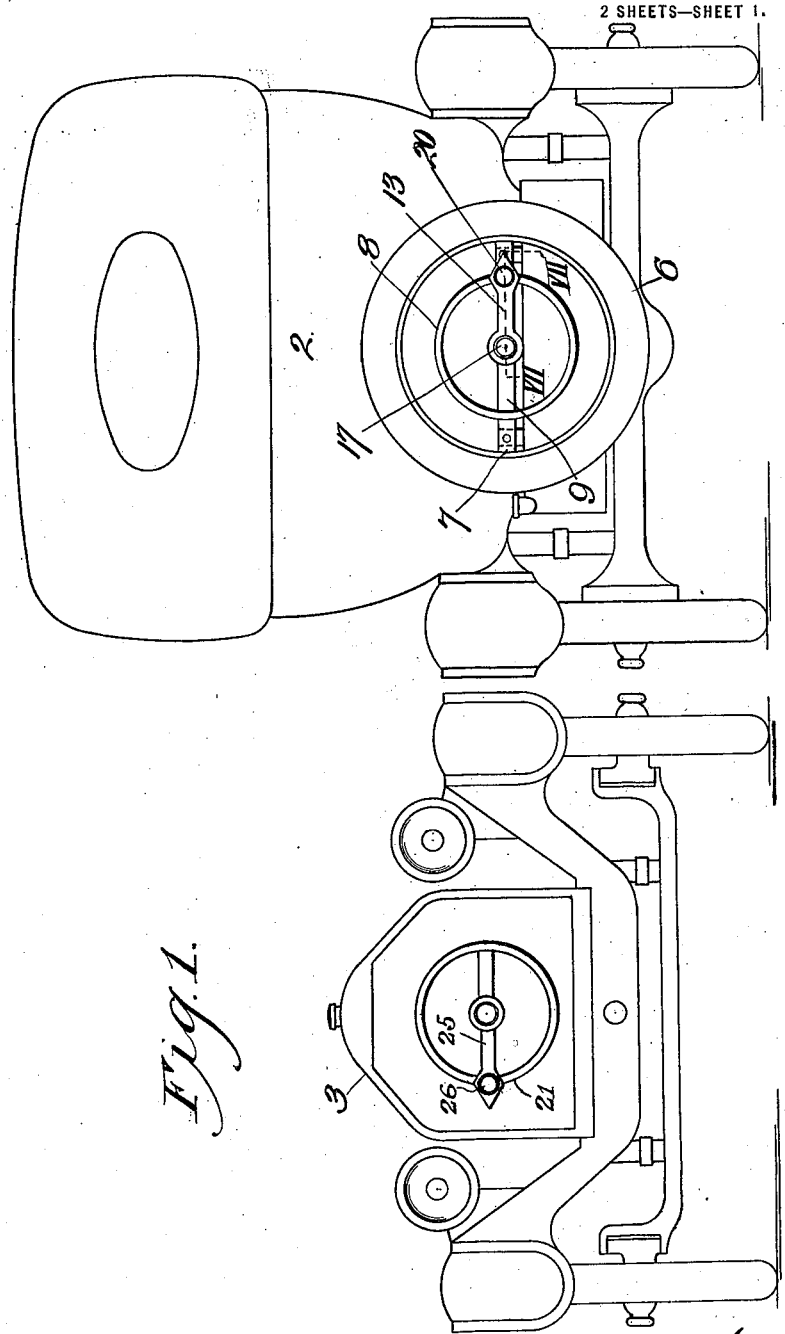
Inventor:
Harry H. Gray.
By George F. Thorpe Atty.

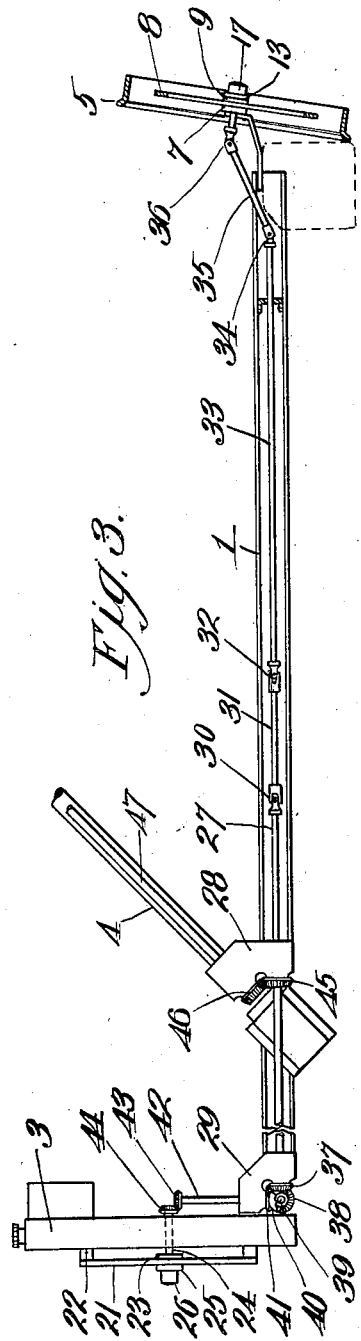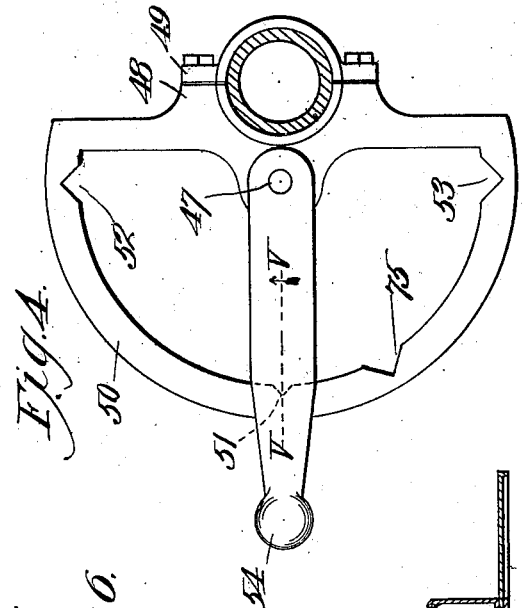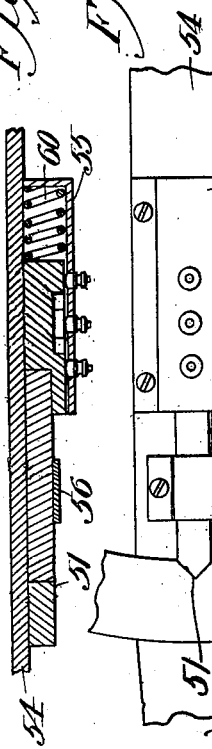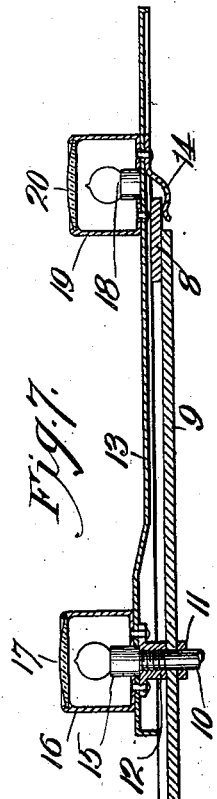

UNITED STATES PATENT OFFICE.

HARRY H. GRAY, OF KANSAS CITY, MISSOURI.

DIRECTION-INDICATOR FOR MOTOR-CARS.

1,379,863.　　　　Specification of Letters Patent.　　Patented May 31, 1921.

Application filed November 13, 1916, Serial No. 132,212. Renewed April 7, 1921. Serial No. 459,337.

*To all whom it may concern:*

Be it known that I, HARRY H. GRAY, a citizen of the United States, residing at Kansas City, in the county of Jackson and State of Missouri, have invented certain new and useful Improvements in Direction-Indicators for Motor-Cars, of which the following is a specification.

The invention relates to indicators for motor cars, and more especially to visual signals to apprise pedestrians in front and motor car drivers approaching or following a car equipped with an indicator, whether such car is to continue on or change its course, and if a change in the line of travel is intended, in which direction the turn is to be made.

One object of the invention is to produce an indicator serviceable by day or night and for either or both ends of a car. Another object is to produce an indicator, which at night, utilizes the tail lamp in coöperation with a direction lamp, to indicate the course of travel or in which direction a turn is to be made.

With these and other objects in view, as hereinafter appear, the invention consists in certain novel and peculiar features of construction and combinations of parts as hereinafter described and claimed, and in order that it may be fully understood reference is to be had to the accompanying drawings, in which—

Figure 1, is a front view of a part of a motor car equipped with an indicator embodying the invention.

Fig. 2, is a rear view of the car.

Fig. 3, is a longitudinal section of the frame of a car and also shows other parts thereof and an extra tire-holder at the rear end of the car, said figure also showing a part of the indicator mechanism.

Fig. 4, is a plan view of the controlling lever and a sector for coöperative use with said lever.

Fig. 5, is an enlarged vertical section on the line V—V of Fig. 4.

Fig. 6, is an inverted plan view of the construction shown by Fig. 5.

Fig. 7, is an enlarged section on the line VII—VII of Fig. 2.

In the said drawings, where like reference characters refer to corresponding parts in all the figures, 1 is the frame, 2 the body, 3 the radiator and 4 the steering column of a motor car of any preferred type. 5 is a holder for an extra tire, said holder being of circular form and suitably supported at the rear end of the body as common in many types of motor cars, 6 indicating a tire mounted on said holder. 7 is a cross bar for said tire-holder and arranged within the latter and concentrically thereof, is a circular guide frame 8, the same having a cross bar 9 adapted for securement in any suitable manner to the cross bar 7 of the tire holder. Of course the particular method of securing the circular guide within the tire holder is unimportant.

Journaled in the cross bars 7 and 9 is a short shaft 10, a collar 11 thereon preventing rearward sliding movement by engagement with cross bar 9. A collar 12 is secured on said shaft at the front side of the cross bar and to a finger 13 disposed radially of the circular guide 8, said finger having a spring clamp 14 engaging said guide to assist shaft 10 in holding the finger against accidental rotation.

15 is the usual tail lamp, the same being shown as secured at the rear end of the shaft 10 within a housing 16 provided with a preferably red lens 17. A lamp 18 is carried by the indicator finger near its outer end, within a housing 19, and said housing is provided with a preferably green lens 20.

A circular guide 21 corresponding to guide 8, is arranged forward of the radiator 3 and is preferably secured to a ring 22 rigid with the radiator. The circular guide 21 is provided with a cross bar 23 corresponding to cross bar 9, and journaled in said cross bar and extending through the radiator 2, is a shaft 24, and mounted on the front end of said shaft is an indicator finger 25 equipped near its free end with a housed lamp 26, corresponding to parts 18, 19 and 20 and in this connection it is desired to state that the indicating fingers 13 and 25 project in the same direction from their respective shafts.

27 is a short longitudinal shaft journaled in a suitable bearing bracket 28, attached to the steering column and said shaft is connected by a universal connection 30 with a short shaft 31 to permit the latter to extend at an angle to shaft 27 if necessary. Shaft 31 is connected by a universal connection 32 to the shaft 33, and the latter is connected by a universal connection 34, to a shaft 35. Shaft 35 is connected in turn by a universal connection 36 with the front end of shaft 10, it being understood that the various shafts 27, 31, 33 and 35, are mounted in suitable bearings, not shown, rigid with the frame 1.

Secured on the front end of shaft 27 is a bevel gear 37 meshing with a bevel gear 38 on a short horizontal shaft 39, and said shaft is provided with a bevel gear 40 faced reversely to gear 39 and meshing with a bevel gear 41 on a vertical shaft 42 provided with a bevel gear 43 at its upper end, meshing with a bevel gear 44 on the rear end of the short shaft 24. Shaft 27 is also provided with a bevel gear 45 enmeshed with a bevel gear 46 on a shaft 47 paralleling the steering column 4, and journaled at its lower end in bracket 28 and at its upper end in bracket 48, clamped by a bearing cap 49, to the steering column below the steering wheel, not shown.

The bracket 48 is provided with a sector 50 having a shallow V-notch 51 midway its length, and with deeper V-notches 52 and 53 forward and rearward respectively of shaft 47.

A controlling lever 54 is secured on the upper end of said shaft 47 to turn the same and is adapted to operate along the upper face of the sector 50. When the shaft occupies the position shown in Fig. 4, the indicator fingers extend vertically downward. When the lever is moved forwardly to a portion over notch 52 the indicators are swung to the position shown in Figs. 1 and 2. When the lever is adjusted to extend over notch 53 of the sector, the indicators are pointing to the left. When the fingers point downward the car should be either moving straight ahead or stationary. When they point to the right it is an indication that the car is to be turned in that direction and when they point to the left they indicate that the driver intends to turn to the left. To secure the lever against accidental movement when in either of the positions mentioned, a pair of keepers 55 and 56 are secured to the underside of the lever, and fitting slidably in said keepers is a latch bolt having a pointed or V-shaped front end 59 for engagement with either of said notches of the sector or for sliding along one edge of the sector between the notches. A spring 60 within the keepers 55 tends to advance the latch bolt at all times so that it shall enter the successively encountered notches as the lever is swung along the sector.

When the controlling lever 54 is in normal position, the indicating fingers are vertical and hence indicate that a direct line of travel is to be followed. When the lever is adjusted to dispose the latch bolt in engagement with either of the notches, it indicates the fingers are in position to apprise pedestrians and others that the car is to make a turn. The lamp 15 may constitute the regular tail lamp and may be an oil lamp or an electric lamp. The same is true of the direction indicating lamps 18.

It will be obvious that if it is desired to set the indicating fingers at a point indicating that the car is to be brought to rest, the sector may be provided with an additional deep notch for the reception of the latch bolt, such notch serving the purpose of holding the lever where set, the extra notch for convenience of illustration being indicated at 75.

From the above description it will be apparent that I have produced a direction indicator for motor cars embodying the features of advantage enumerated as desirable and I wish it to be understood that while I have illustrated and described the preferred embodiment of the same, I reserve the right to make all changes falling within the spirit and scope of the appended claims.

I claim:

1. In a direction indicator for motor cars, a circular holder having a cross-bar, a circular guide frame concentrically within the holder and also provided with a cross-bar, a shaft journaled in the said cross-bars, a finger on said shaft, yielding means to prevent accidental movement of the finger by engagement with the circular guide, a lamp secured to said shaft, a lamp carried by the finger for movement thereby in a circular direction, and means for imparting rotation to said shaft; said lamps being of contrasting colors.

2. In a direction indicator for motor cars, a circular holder having a cross-bar, a circular guide frame concentrically within the holder and also provided with a cross-bar, a shaft journaled in said cross-bars, a finger on said shaft, a spring clasp secured to the finger and slidingly engaging the circular guide to prevent accidental movement of the finger, a lamp secured to said shaft, a lamp carried by the finger for movement thereby in a circular direction, and means for imparting rotation to said shaft to cause the lamp carried by the finger to travel circularly around the other lamp, the lamps being of contrasting colors.

In testimony whereof I affix my signature in presence of two witnesses.

HARRY H. GRAY.

Witnesses:
PERCY A. BUDD,
G. Y. THORPE.